(12) United States Patent
Henshaw et al.

(10) Patent No.: US 9,828,099 B2
(45) Date of Patent: *Nov. 28, 2017

(54) DEPLOYABLE CENTER CONSOLE SHELF FOR AN AIRCRAFT PASSENGER SEAT

(71) Applicant: B/E Aerospace, Inc., Wellington, FL (US)

(72) Inventors: Robert J. Henshaw, Newnan, GA (US); Mark A. Kruse, Atlanta, GA (US); Suzuko Hisata, Atlanta, GA (US)

(73) Assignee: B/E Aerospace, Inc., Wellington, FL (US)

( * ) Notice: Subject to any disclaimer, the term of this patent is extended or adjusted under 35 U.S.C. 154(b) by 328 days.

This patent is subject to a terminal disclaimer.

(21) Appl. No.: 14/667,133

(22) Filed: Mar. 24, 2015

(65) Prior Publication Data

US 2015/0274299 A1 Oct. 1, 2015

Related U.S. Application Data

(60) Provisional application No. 61/970,531, filed on Mar. 26, 2014.

(51) Int. Cl.
*B64D 11/06* (2006.01)

(52) U.S. Cl.
CPC .......... *B64D 11/0606* (2014.12); *B64D 11/06* (2013.01); *B64D 11/0602* (2014.12); *B64D 11/0605* (2014.12); *B64D 11/0638* (2014.12)

(58) Field of Classification Search
CPC ....... B64D 11/00; B64D 11/003; B64D 11/06; B64D 11/0602; B64D 11/0606; B64D 11/0624; B64D 11/0627; B64D 11/0638; B64D 11/0646; B64D 11/0023; B64D 11/0605
See application file for complete search history.

(56) References Cited

U.S. PATENT DOCUMENTS

| 3,583,760 | A | * | 6/1971 | McGregor | A47B 5/006 297/145 |
| 3,632,161 | A | * | 1/1972 | Arfaras | A47C 7/70 297/145 |
| 3,893,729 | A | * | 7/1975 | Sherman | B64D 11/0693 244/118.6 |
| 4,440,443 | A | * | 4/1984 | Nordskog | A47C 7/38 297/217.4 |
| 6,059,364 | A | * | 5/2000 | Dryburgh | A47C 1/0352 105/322 |

(Continued)

OTHER PUBLICATIONS

International Search Report for PCT/US2015/022180 dated Jun. 29, 2015.

*Primary Examiner* — Tien Q Dinh
*Assistant Examiner* — Michael A. Fabula
(74) *Attorney, Agent, or Firm* — Shumaker, Loop & Kendrick, LLP

(57) ABSTRACT

An aircraft seating group including first and second laterally-adjacent seats, a center console positioned between the seats, a rear privacy shell positioned behind the seats and forming part of the center console, a vertical partition extending forward from the rear privacy shell to divide the center console, and a deployable shelf positioned to one side of the vertical partition, the shelf configured to hold a tablet for viewing by a passenger facing the shelf.

15 Claims, 4 Drawing Sheets

(56) References Cited

U.S. PATENT DOCUMENTS

| | | | | |
|---|---|---|---|---|
| 7,178,871 B1* | 2/2007 | Round | B60N 2/242 | 297/217.3 |
| 7,578,470 B2* | 8/2009 | Plant | B64D 11/06 | 244/118.6 |
| 8,596,206 B2* | 12/2013 | Legeay | B60N 3/002 | 108/137 |
| 8,690,254 B2* | 4/2014 | Cailleteau | B64D 11/06 | 244/118.6 |
| 9,150,129 B2* | 10/2015 | Suhre | B60N 2/4606 | |
| 9,200,796 B2* | 12/2015 | Ehrmann | F21V 33/00 | |
| 9,216,665 B2* | 12/2015 | Herault | B60N 2/00 | |
| 9,533,765 B2* | 1/2017 | Vergnaud | B64D 11/06 | |
| 9,545,999 B2* | 1/2017 | Henshaw | B64D 11/0601 | |
| 2002/0066392 A1* | 6/2002 | Calam | B60N 2/468 | 108/33 |
| 2003/0085597 A1* | 5/2003 | Ludeke | B64D 11/06 | 297/184.14 |
| 2003/0188672 A1* | 10/2003 | Parent | B64D 11/0638 | 108/134 |
| 2006/0219843 A1* | 10/2006 | Martin | B60N 2/34 | 244/118.6 |
| 2006/0288377 A1* | 12/2006 | Hsieh | H04N 5/765 | 725/76 |
| 2007/0085389 A1* | 4/2007 | Schurg | B64D 11/06 | 297/184.1 |
| 2007/0246981 A1* | 10/2007 | Plant | B64D 11/06 | 297/248 |
| 2008/0252109 A1* | 10/2008 | Salzer | B60N 2/46 | 297/173 |
| 2009/0121523 A1* | 5/2009 | Johnson | B60N 3/004 | 297/140 |
| 2009/0146004 A1* | 6/2009 | Plant | B64D 11/06 | 244/118.5 |
| 2009/0146006 A1* | 6/2009 | Park | B60N 2/345 | 244/118.6 |
| 2009/0243352 A1* | 10/2009 | Cailleteau | B64D 11/06 | 297/188.01 |
| 2009/0302158 A1* | 12/2009 | Darbyshire | B64D 11/06 | 244/118.6 |
| 2010/0252680 A1* | 10/2010 | Porter | B60N 2/01 | 244/118.6 |
| 2011/0156450 A1* | 6/2011 | Collins | B60N 3/002 | 297/135 |
| 2011/0186682 A1* | 8/2011 | Collins | B64D 11/06 | 244/118.6 |
| 2011/0210204 A1* | 9/2011 | Collins | B64D 11/06 | 244/118.6 |
| 2012/0104165 A1* | 5/2012 | Dobrusin | B64D 11/06 | 244/118.6 |
| 2012/0133180 A1* | 5/2012 | Moulton | B64D 11/0605 | 297/135 |
| 2012/0167807 A1* | 7/2012 | Legeay | B60N 3/002 | 108/41 |
| 2012/0292957 A1* | 11/2012 | Vergnaud | B64D 11/06 | 297/188.08 |
| 2012/0298798 A1* | 11/2012 | Henshaw | B64D 11/06 | 244/118.6 |
| 2012/0318918 A1* | 12/2012 | Johnson | B64D 11/06 | 244/118.6 |
| 2013/0076082 A1* | 3/2013 | Herault | B60N 2/00 | 297/173 |
| 2013/0093221 A1* | 4/2013 | Ligonniere | B64D 11/06 | 297/173 |
| 2013/0106156 A1* | 5/2013 | Orson | B64D 11/06 | 297/217.3 |
| 2013/0241258 A1* | 9/2013 | Wallace | A47C 17/12 | 297/354.13 |
| 2013/0248655 A1* | 9/2013 | Kroll | B64D 11/06 | 244/118.6 |
| 2013/0320724 A1* | 12/2013 | Plant | B64D 11/06 | 297/232 |
| 2013/0343072 A1* | 12/2013 | Ehrmann | F21V 33/00 | 362/471 |
| 2014/0300148 A1* | 10/2014 | Frost | B64D 11/06 | 297/173 |
| 2014/0300152 A1* | 10/2014 | Park | B64D 11/06 | 297/232 |
| 2014/0361585 A1* | 12/2014 | Henshaw | B60N 2/01 | 297/174 R |
| 2015/0001341 A1* | 1/2015 | Ersan | B64D 11/06 | 244/118.6 |
| 2015/0151652 A1* | 6/2015 | Jerome | B60N 2/10 | 297/325 |
| 2015/0166183 A1* | 6/2015 | Henshaw | B64D 11/0601 | 244/118.6 |
| 2015/0210393 A1* | 7/2015 | Savian | B64D 11/0601 | 244/118.6 |
| 2015/0321592 A1* | 11/2015 | De Morais | B64D 11/06 | 297/147 |
| 2016/0059966 A1* | 3/2016 | Dryburgh | B64D 11/00 | 244/118.6 |
| 2016/0083096 A1* | 3/2016 | Gagnon | B64D 11/06 | 108/20 |
| 2016/0167555 A1* | 6/2016 | Allen | B60N 3/004 | 108/40 |
| 2017/0015420 A1* | 1/2017 | Henshaw | B64D 11/0606 | |

* cited by examiner

DEPLOYABLE CENTER CONSOLE SHELF FOR AN AIRCRAFT PASSENGER SEAT

CROSS-REFERENCE TO RELATED APPLICATION

This application claims priority from U.S. Application No. 61/970,531 filed Mar. 26, 2014, the entirety of which is incorporated by reference herein.

TECHNICAL FIELD AND BACKGROUND OF THE INVENTION

The present invention relates generally to an aircraft passenger seat arrangement and seat amenities associated with aircraft passenger seats, and more particularly, to a stowage shelf incorporated into a center console rear privacy shell of laterally adjacent passenger seats, the shelf configured to deploy to support a tablet in a position to be viewed by a passenger in a reclined sitting position laying facing the center console.

Aircraft seating arrangements commonly include multiple rows of laterally-adjacent seats. Economy class seats within the same row often share common frame members such as beam tubes, armrests, and supportive legs, while first and premium class seats typically each have their own seat base frame. In either seating class, laterally-adjacent seats can be provided with a rear privacy shell that provides privacy between the row to which it is attached and an aft-positioned row. While the backside of the privacy shell is often used to support amenities for aft-seated passengers, such as video monitors, tray tables and storage pockets, up until the present invention the front side of the privacy shell was yet to be utilized for serving the forward-seated passengers.

In either seating class, laterally-adjacent seats may be separated by armrests, and in some cases, center consoles including armrests. Center consoles not only space laterally-adjacent seats farther apart, they also function to house seat controls, seat amenities, armrests and storage compartments. Thus, center consoles not only provide a degree of separation and privacy for passengers, they improve the flying experience.

With advancements in smart phone and tablet technology, it has become commonplace for passengers to bring aboard their own personal electronic devices for use during a flight to watch movies, work, and play games. When using electronic devices to watch movies, it is not necessary to continuously handle the device, thus it would be desirable to have a place to support the tablet at the optimum angle for viewing. This would free the passenger's hands, allowing the passenger to do other things such as eat and drink without having to disrupt the viewing experience.

While tablet holders exist for holding tablets against the seatback of a forward positioned seat, conventional solutions are tablet specific and cannot serve all rows, particularly the first row of each seating class. Further, seatback holders require that the passenger remain forward facing, and thus are not able to accommodate side facing or laying sitting positions. Therefore, what is needed is another solution for supporting tablets and other items at a comfortable viewing angle that gives a seated passenger options in their sitting position.

BRIEF SUMMARY OF THE INVENTION

It is an object of the invention to provide a center console for being positioned laterally adjacent an aircraft passenger seat or between laterally-adjacent passenger seats within the same row of seats.

It is another object of the invention to provide a center console for being positioned alongside a passenger seat and including a deployable shelf.

It is another object of the invention to provide a center console including a deployable shelf configured to hold a tablet for viewing by a sitting or laying passenger facing in the direction of the shelf.

It is another object of the invention to provide a center console that extends forward from a rear privacy shell positioned behind a pair of laterally-adjacent seats, the center console including a deployable shelf configured to pivot down from a stowed position in which the shelf is generally vertical to a deployed position in which the shelf is generally horizontal, the shelf serving one of the laterally-adjacent seats, for example, to hold a tablet or other electronic device for viewing.

It is another object of the invention to provide a center console for serving laterally-adjacent passenger seats, the center console including a vertical privacy partition dividing the center console by extending forward from a rear privacy shell positioned behind the laterally-adjacent seats, each side of the center console including storage space and a deployable shelf for supporting a tablet for viewing by a sitting or laying passenger facing the shelf.

To achieve the foregoing and other objects and advantages, in one embodiment the present invention provides an aircraft seating group including first and second laterally-adjacent passenger seats, a center console positioned between the first and second laterally-adjacent passenger seats, a rear privacy shell positioned behind the first and second laterally-adjacent passenger seats forming part of the center console, a vertical partition extending forward from the rear privacy shell to divide the center console, and a deployable shelf positioned to one side of the vertical partition configured to stow against the rear privacy shell and deploy to a horizontal position forward of the rear privacy shell.

In a further aspect, the deployable shelf may be pivotably attached at one end to the rear privacy shell such that the deployable shelf pivots between the stowed position against the rear privacy shell and the deployed horizontal position forward of the rear privacy shell.

In a further aspect, the deployable shelf may take the form of a tray having a bottom with upwardly extending sidewalls along at least two sides of the tray.

In a further aspect, one of the sidewalls may be interrupted by a cable passage for allowing a cable to pass therethrough.

In a further aspect, the deployable shelf may be positioned vertically above a control panel including a USB port for receiving a USB cable.

In a further aspect, the deployable shelf may have a deployable at one end for moving the deployable shelf between the stowed and deployed positions.

In a further aspect, the vertical partition may be topped with a horizontal roof.

In a further aspect, the seating group may include a deployable shelf positioned to either side of the vertical partition.

In a further aspect, the deployable shelf in the horizontal position may be vertically lower than a headrest of the respective one of the first and second laterally-adjacent seats that the deployable shelf serves.

In another embodiment, the present invention provides a console for being positioned alongside an aircraft passenger seat having a rear privacy shell, the console including a vertical partition extending forward from the rear privacy shell and a deployable shelf positioned to one side of the vertical partition, the deployable shelf configured to stow against the rear privacy shell and deploy to a horizontal position forward of the rear privacy shell.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
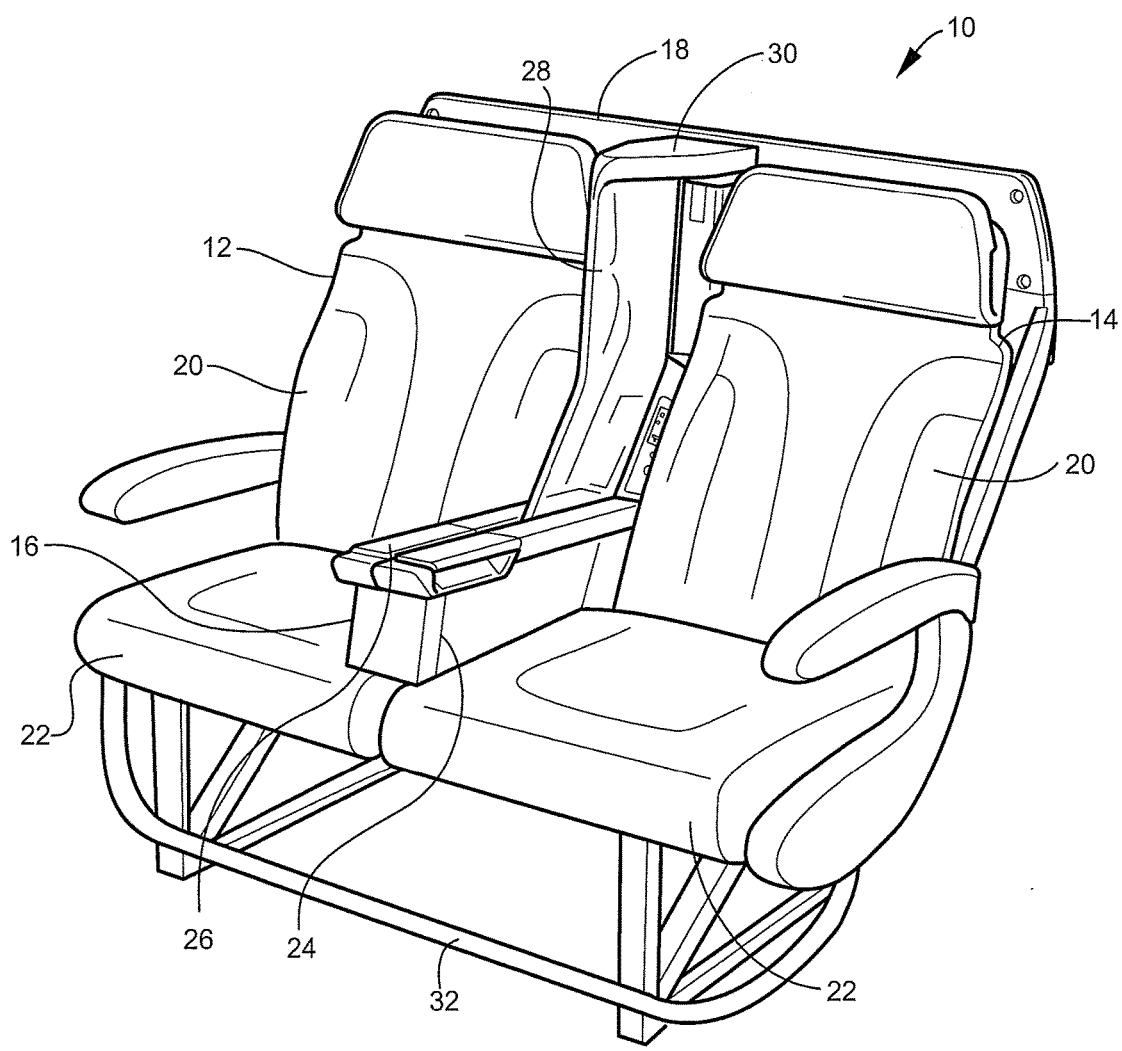
FIG. 1 is a perspective view of a seating group including laterally-adjacent seats separated by a center console including a deployable shelf according to an embodiment of the invention.

Referring to FIG. 1, a seating group according to one embodiment of the invention is shown generally at reference numeral 10. The seating group 10 generally includes first and second laterally-adjacent passenger seats 12, 14 separated by a center console 16. A rear privacy shell 18 is positioned behind the seatbacks 20 and extends the width of the seating group 10. The rear privacy shell 18 may be formed from lightweight durable plastics or other material and may serve to house electronics, electrical connections, data connections, etc., as well as serve to support tray tables, storage compartments, etc., for use by aft-seated passengers in the row behind. The rear privacy shell 18 may be supported by the seat frame as shown, or may be free-standing on the floor. The seating group 10 may include a greater number of seats and consoles than shown, for example, three seats and two center consoles. Alternatively, the seating group may include a single seat and a console positioned alongside one side of the seat. Multiple like seating groups 10 may be arranged into rows to form a seating class with the aircraft cabin. The seating group 10 may further include a luggage retaining bar 32 that extends across the front of the seating group elevated off the floor for preventing luggage stored beneath the seats 12, 14 from sliding forward.

Each seat 12, 14 includes a seat back 20 and a seat bottom 22, and may optionally include a leg rest. The seats 12, 14 may be configured to selectively adjust between upright and reclined sitting positions, and the reclining movement of the seats may be independent of the rear privacy shell 18. In other words, the seat backs may recline while the rear privacy shell 18 remains stationary.

The center console 16 is divided into a lower console portion 24 and an upper console portion 28. The lower console portion 24 includes the armrests 26, and may house the seat controls and associated cabling, among other amenities. The lower console portion 24 extends substantially the length of the seat bottom 20 and spaces apart the laterally-adjacent seats 12, 14. The upper console portion 28 or "vertical partition" extends vertically upward from the lower console portion 24 to about a top of the rear privacy shell 18, and from the rear privacy shell 18 forward about half of the length of the lower console portion 24. The top of the upper console portion extends left and right to form a roof 30 that further defines the underlying console space. Thus, the lower console portion 24 and the upper console portion 28 together form a partition between the hips and upper bodies of adjacent passengers.

The upper console portion 28 and the rear privacy shell 18 cooperatively define a space for locating a deployable shelf 34, and beneath the shelf are located the seat electronics, electrical connections (e.g., AC outlet), data connections (e.g., USB port), headphone jack, volume controls, etc.

Figure 2:
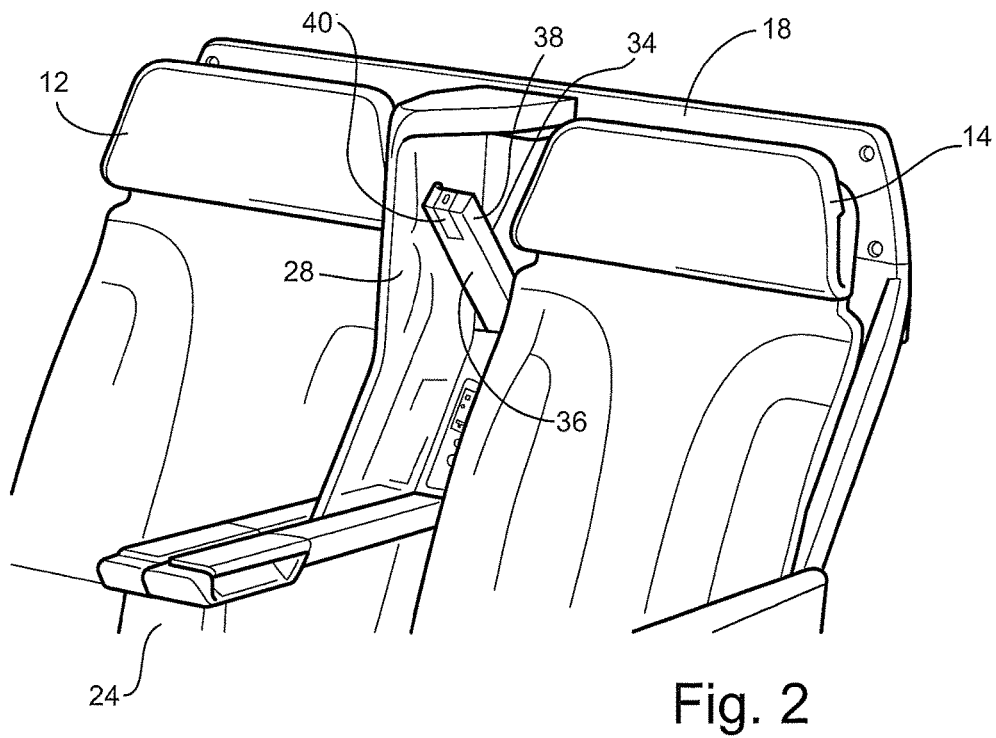
FIG. 2 is a detailed view of the seating group showing the shelf partly deployed.
Figure 3:
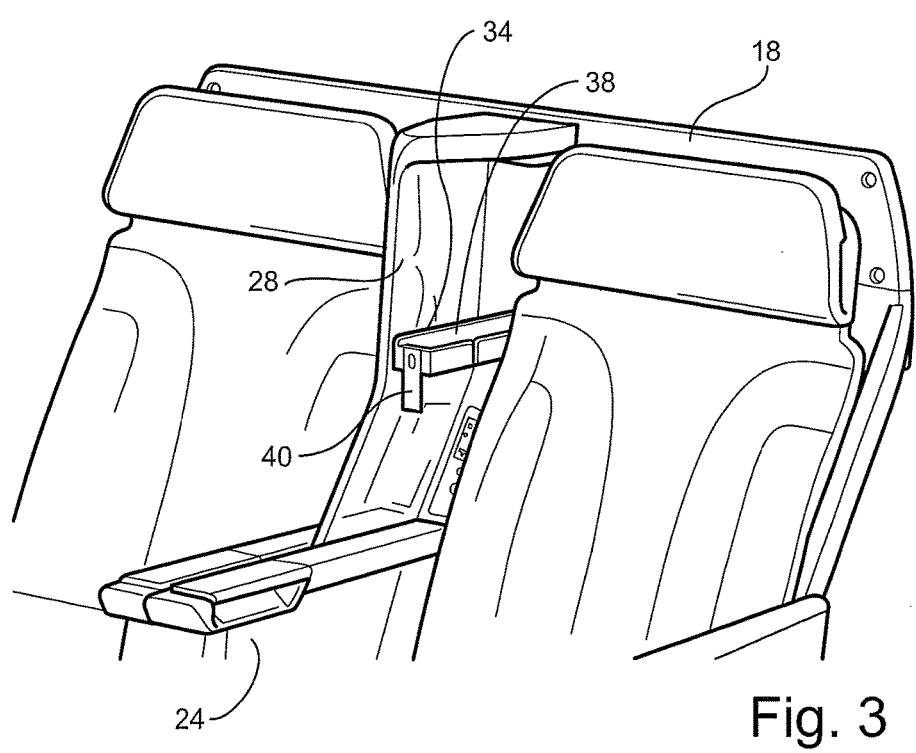
FIG. 3 is a detailed view of the seating group showing the shelf fully deployed to a horizontal position.

Referring to FIGS. 2 and 3, the deployable shelf 34 folds down (e.g., pivots) from a stowed position against or within the rear privacy shell 18, to a deployed horizontal position. FIG. 2 shows the shelf 34 partially deployed. FIG. 3 shows the shelf 34 fully deployed. The shelf 34 is positioned at about or just below the height of the head of the seated passenger such that the seated passenger can view a tablet supported on the shelf at the optimum viewing angle (i.e., at eye level) when the passenger is laying on his/her side and facing the shelf. As best shown in FIG. 3, when the shelf 34 is in the deployed position the shelf is vertically below the headrest of its respective seat.

The shelf 34 is a tray including a bottom 36 and upwardly extending sidewalls 38, or perimeter railing, that serves to hold items in the tray when stowed and securely supports items on the shelf when deployed. The sidewall 38 may be provided on two or more sides, for example, at the front and along the side of the tray facing the seated passenger. Items that may be stowed in the shelf 34 or supported on the shelf include, for example, tablets, smart phones, headphones, glasses, etc. The bottom 36 may be hinged at one end to the rear privacy wall 18 such that the free end of the shelf pivots downward toward horizontal to deploy the shelf, and upward toward vertical to stow the shelf. The shelf 34 may include a folding handle 40 at the end opposite the hinge for moving the shelf between the stowed and deployed positions.

Figure 4:
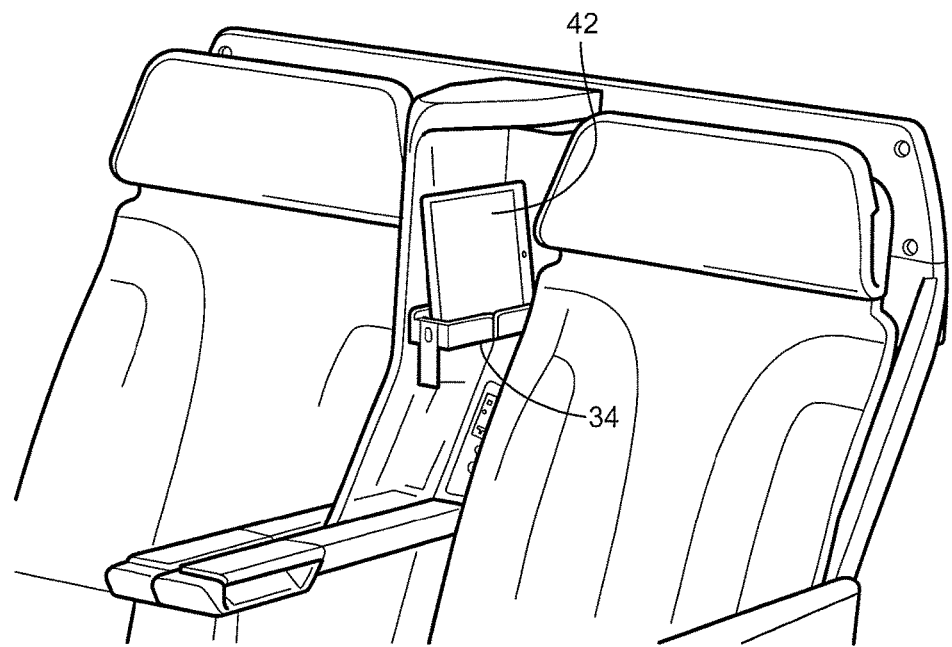
FIG. 4 is a detailed view of the seating group showing a tablet in a horizontal orientation on the deployed shelf.
Figure 5:
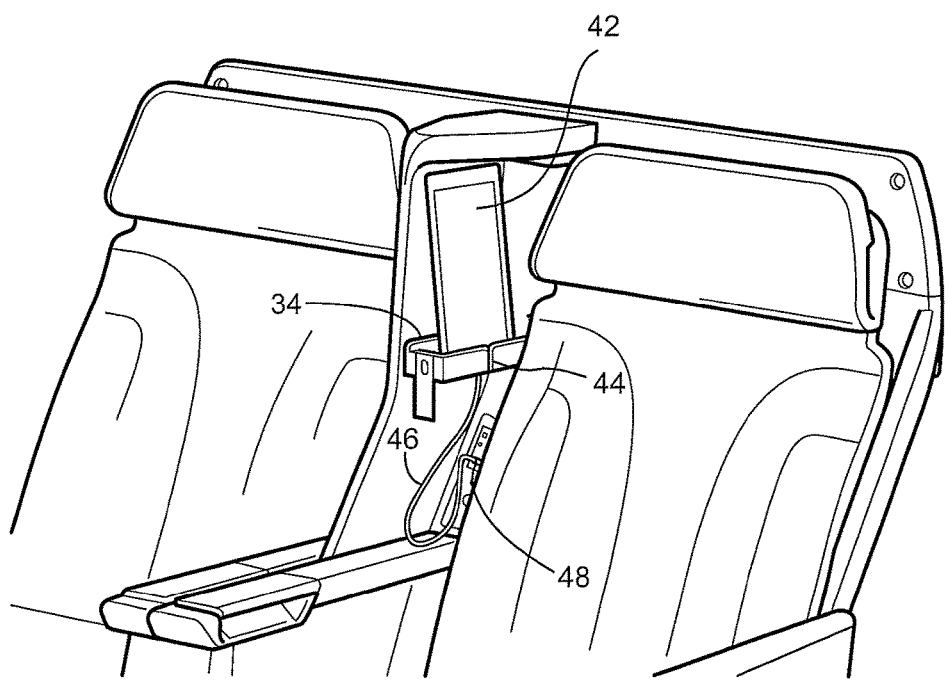
FIG. 5 is a detailed view of the seating group showing a tablet in a vertical orientation on the deployed shelf.

Referring to FIG. 4, a horizontally-oriented tablet 42 is shown supported on the shelf to position of the screen at eye level to a seated passenger sitting or laying facing the upper console portion 28. Referring to FIG. 5, the same tablet 42 is shown supported on the shelf but oriented vertically to position of the screen at eye level to a seated passenger laying facing the upper console portion 28. FIGS. 4 and 5 further show that the shelf 34 has a deployed length sufficient to position the tablet 42 supported thereon forward of the seatback 22 so as to be viewed by a seated passenger laying on their side and facing the upper console portion 28. The shelf 34 is positioned relative to the vertical partition 28 such that the tablet can lean against the vertical partition to hold the tablet substantially upright.

Figure 6:
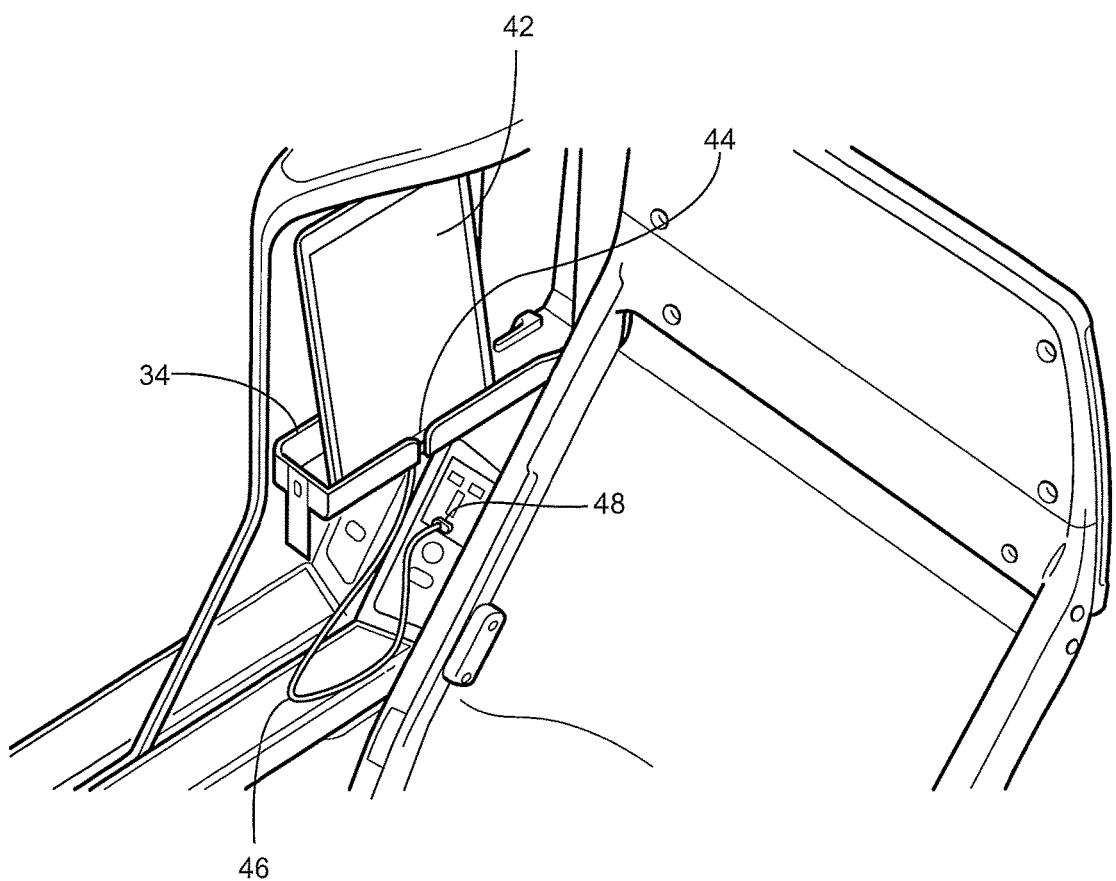
FIG. 6 is a detailed view of the center console showing the data/power cable of the tablet routed through a cable passage and connected to a USB port located in the center console.

Referring to FIGS. 5 and 6, the perimeter railing 38 of the shelf 34 is interrupted along one side by a cable passage 44 that allows cabling (e.g., USB cable, headphone cable, etc.) to pass therethrough to be connected below the shelf to a data/power port or headphone jack when the tablet 42 is sitting on the shelf. As shown, the USB cable 46 connected to the bottom of the tablet 42 passes through the cable passage 44 and connects to a USB port 48 positioned beneath the shelf 34. The cable passage 44 thus manages the cable 46, allowing the tablet 42 to be oriented vertically while keeping the cable out of the way of the passenger.

The center console generally functions to provide a degree of privacy to laterally-adjacent passengers. While only one side of the center console is shown, it is envisioned that deployable shelves may be positioned to either side of the vertical partition 28 such that laterally-adjacent passengers each have their own deployable shelf. Each side of the center console may also have its own seat and media controls located in a control panel vertically below the deployable shelf.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An aircraft seating group, comprising:
   first and second laterally-adjacent passenger seats, wherein
   each of the first and second laterally-adjacent passenger seats is associated with respective first and second arm rests;
   a rear privacy shell positioned behind the first and second laterally-adjacent passenger seats;
   a vertical partition extending forward from the rear privacy shell between the first and second laterally-adjacent passenger seats and above the first and second arm rests; and
   a deployable shelf pivotally connected to one of the rear privacy shell and the vertical partition, wherein
   the deployable shelf is configured to stow against the rear privacy shell and to deploy to a horizontal position extending outward from the rear privacy shell.

2. The aircraft seating group of claim 1, wherein the deployable shelf comprises a tray including:
   a bottom; and
   a plurality of sidewalls upwardly extending from the bottom along at least two sides of the tray.

3. The aircraft seating group of claim 2, wherein one of the plurality of sidewalls is interrupted with a cable passage for allowing a cable to pass therethrough.

4. The aircraft seating group of claim 3, wherein the deployable shelf is positioned vertically above a USB port for receiving the cable.

5. The aircraft seating group of claim 1, further comprising a deployable handle at one end of the deployable shelf, wherein
   the deployable handle is configured for moving the deployable shelf between the stowed and deployed positions.

6. The aircraft seating group of claim 1, further comprising a horizontal roof,
   wherein the vertical partition is topped with the horizontal roof.

7. The aircraft seating group of claim 1, further comprising a second deployable shelf positioned to an opposite side of the vertical partition from the deployable shelf.

8. The aircraft seating group of claim 1, wherein the deployable shelf in the horizontal position is vertically lower than a headrest of the respective one of the first and second laterally-adjacent seats that the deployable shelf serves.

9. A console for being positioned alongside an aircraft passenger seat having a rear privacy shell, comprising:
   a vertical partition extending forward from the rear privacy shell; and
   a deployable shelf positioned to one side of the vertical partition, wherein
   the deployable shelf is pivotally attached at one end to one of the rear privacy shell and the vertical partition, and
   the deployable shelf is configured to stow against the rear privacy shell and to deploy to a horizontal position forward of the rear privacy shell.

10. The console of claim 9, wherein the deployable shelf comprises a tray, comprising:
    a bottom; and
    a plurality of upwardly extending sidewalls along at least two sides of the tray.

11. The console of claim 10, wherein one of the plurality if sidewalls is interrupted by a cable passage for allowing a cable to pass therethrough.

12. The console of claim 11, wherein the deployable shelf is positioned vertically above a USB port for receiving the cable.

13. The console of claim 9, further comprising a deployable handle at one end of the deployable shelf, wherein the deployable handle is configured for moving the deployable shelf between the stowed and deployed positions.

14. The console of claim 9, further comprising a horizontal roof,
    wherein the vertical partition is topped with the horizontal roof.

15. The console of claim 9, wherein the deployable shelf in the horizontal position is vertically lower than a headrest of the aircraft passenger seat.

* * * * *